US012600145B2

(12) United States Patent
Law et al.

(10) Patent No.: US 12,600,145 B2
(45) Date of Patent: Apr. 14, 2026

(54) FLUID-EJECTION DEVICE AIR PURGER DETECTION

(71) Applicant: Hewlett-Packard Development Company, L.P., Spring, TX (US)

(72) Inventors: Kok Leong Law, Singapore (SG); Hong Hor Teh, Singapore (SG); Kok Heng Ng, Singapore (SG)

(73) Assignee: Hewlett-Packard Development Company, L.P., Spring, TX (US)

( * ) Notice: Subject to any disclaimer, the term of this patent is extended or adjusted under 35 U.S.C. 154(b) by 126 days.

(21) Appl. No.: 18/683,893

(22) PCT Filed: Aug. 18, 2021

(86) PCT No.: PCT/US2021/046437

§ 371 (c)(1),
(2) Date: Feb. 15, 2024

(87) PCT Pub. No.: WO2023/022710

PCT Pub. Date: Feb. 23, 2023

(65) Prior Publication Data

US 2024/0367442 A1 Nov. 7, 2024

(51) Int. Cl.

| | |
|---|---|
| ***B41J 2/19*** | (2006.01) |
| ***B41J 2/18*** | (2006.01) |
| ***B41J 25/00*** | (2006.01) |
| ***B41J 29/54*** | (2006.01) |

(52) U.S. Cl.
CPC . *B41J 2/19* (2013.01); *B41J 2/18* (2013.01); *B41J 25/001* (2013.01); *B41J 29/54* (2013.01)

(58) Field of Classification Search
CPC . B41J 2/175; B41J 2/19; B41J 2/17513; B41J 2/1707; B41J 29/38; B41J 2/16526; B41J 2/16508; B41J 2/18; B41J 25/001; B41J 29/54; B41J 29/02; B41J 19/207
See application file for complete search history.

(56) References Cited

U.S. PATENT DOCUMENTS

| | | | |
|---|---|---|---|
| 2013/0155135 | A1 | 6/2013 | Govyadinov et al. |
| 2020/0353755 | A1 | 11/2020 | Malik et al. |
| 2021/0094274 | A1 | 4/2021 | Ortiz Mompel et al. |
| 2021/0197569 | A1 | 7/2021 | Plummer |

FOREIGN PATENT DOCUMENTS

| | | | |
|---|---|---|---|
| EP | 1359027 | A2 | 11/2003 |
| WO | 2021/150233 | A1 | 7/2021 |

*Primary Examiner* — Jannelle M Lebron
(74) *Attorney, Agent, or Firm* — Foley & Lardner LLP

(57) ABSTRACT

In some examples, a fluid-ejection device can include a fluidic tube to fluidically connect to a fluid supply, a carriage having a fluidic interconnector fluidically connectable to the fluidic tube and movable between a first position and a second position, a receiver to receive an air purger, wherein the air purger, when present, is coupled to the receiver and fluidically connectable to the fluidic interconnector, and a controller to cause the carriage to actuate from the first position to the second position, determine a location of the carriage at the second position, and based on the location of the carriage at the second position, detect a status of the air purger, a status of an engageable lock in the air purger, or both.

15 Claims, 6 Drawing Sheets

FLUID-EJECTION DEVICE AIR PURGER DETECTION

BACKGROUND

Printing devices, including standalone printers as well as all-in-one (AIO) printing devices that combine printing functionality with other functionality like scanning and copying, can use a variety of different printing techniques. A type of printing technology is inkjet technology, which is more generally a type of fluid-ejection technology. A fluid-ejection device, such as a printhead or a printing device having such a printhead, includes a number of fluid-ejection elements with respective nozzles from which fluid like ink is selectively ejectable.

DETAILED DESCRIPTION

Figure 1:
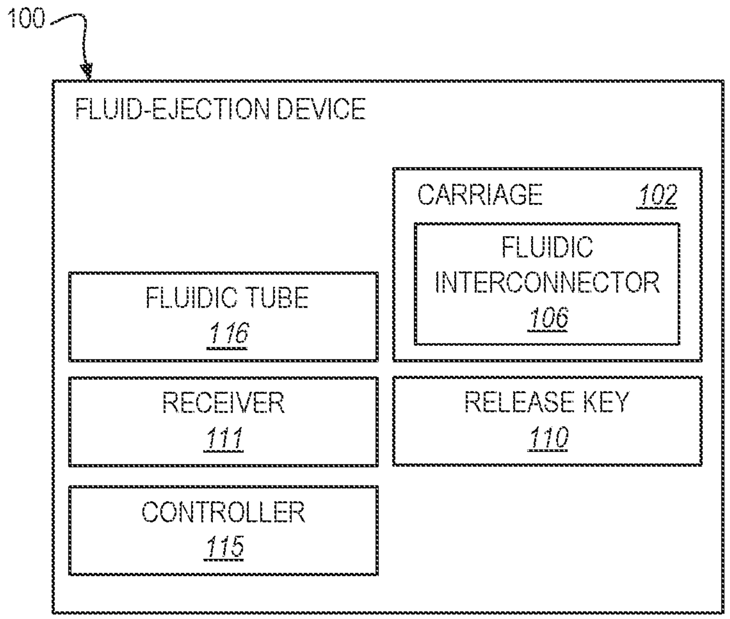
FIG. 1 is a block diagram of an example fluid-ejection device.

Inkjet printing devices are fluid-ejection devices that selectively eject fluid like ink. Two types of fluid-ejection devices include tank-on-printhead devices and continuous ink supply system (CISS) devices. In the former, fluid supplies can be incorporated with a printhead in a printhead assembly that is inserted into a carriage of a fluid-ejection device. When any fluid supply of the assembly has been depleted, the entire assembly has to be replaced, even if other fluid supplies have not been exhausted, and even though the printhead itself is likely to still be in good operating condition.

By comparison, in a CISS fluid-ejection device, the fluid supplies are not part of the printhead assembly that includes the printhead and that is insertable into the device's carriage. Rather, the fluid supplies are located off-axis (i.e., off the axis on which the carriage is movable back and forth), and fluidic tubes fluidically couple the fluid supplies to the carriage and thus to the printhead assembly. The fluid supplies can thus be larger, and fluid can be continuously supplied to the printhead. When a fluid supply runs low, it can be replenished before the supply becomes depleted, potentially even while printing is occurring.

During initial setup of a CISS fluid-ejection device, the fluid supplies may be filled for the first time. Before a first use of the device, air then has to be purged from the fluidic tubes fluidically coupling the fluid supplies to the carriage. The air purging process draws fluid from the supplies through the tubes and to the carriage. If air purging is not performed, the fluid-ejection device may not operate correctly, and may become damaged, and/or may reduce an operation lifetime of the fluid-ejection device, for instance due to air remaining in tubes of the fluid-ejection device and thus impacting operation/components of the fluid ejection device.

CISS fluid-ejection devices usually have end users manually perform the initial air purging. Air purging may not typically occur at time of device manufacture, for instance, because it has to be performed after initial filling of the fluid supplies, and the supplies have to remain empty and dry for shipment of the fluid-ejection devices. Failure to perform initial air purging at all, or failure to perform air purging correctly, may result in a poor end user out-of-box (OOB) experience, and even in some instances may cause damage to the fluid-ejection devices before it has even been used once to eject fluid.

As such, some air purging approaches may utilize a spittoon or other structure to capture a volume of fluid that is ejected from nozzles in effort to remove any air from fluidic pathway in a fluid-ejection device. Yet, such approaches may reduce an operation lifetime of the fluid-ejection device due to imparting otherwise unwarranted wear on components (e.g., nozzles) and/or due to a volume of fluid being deposited into a component (e.g., spittoon).

Other purging approaches may employ an air purger that is coupled to a fluid-ejection device. The air purger can remove any air from a fluidic pathway in a fluid-ejection device (e.g., a fluid pathway between a fluid supply and nozzles) and then the air purger can be removed and be disposed of. Yet, such approaches may be prone to error. For instance, a failure (lack of any air purging) will occur when the air purger is not installed during manufacture and/or when an engageable lock (e.g., spring loaded engageable lock) of the air purger becomes prematurely triggered (e.g., due to vibrations during shipping) before an attempt to employ the air purger as intended. Consequently, when employing either of the above purging approaches the fluid-ejection device may not function as intended and the consumer experience may be poor.

As such, fluid-ejection device air purger detection according to the disclosure, as detailed herein, can detect a status (e.g., present or absent) of the air purger, an engageable lock status (e.g., untriggered or triggered) of the air purger, or both. For instance, fluid-ejection device air purger detection can cause the carriage to actuate from the first position to the second position, determine a location of the carriage at the second position, and based on the location of the carriage at the second position, detect a status of the air purger, a status of an engageable lock in the air purger, or both. Similarly, in some examples, fluid-ejection device air purger detection can determine a distance between the first position and the second position, compare the distance to a threshold, and based on the comparison of the distance to the threshold, detect a status (e.g., present or absent) of the air purger, an engageable lock status (e.g., untriggered or triggered) of the air purger, or both. In this way, fluid-ejection device air purger detection can, based on the location of the carriage at the second position and/or the distance between the first position and the second position to detect a status of the air purger, status of an engageable lock, or both Based on the status of the air purger, the engageable lock, or both, fluid-ejection device air purger detection can then selectively employ the air purger or a back-up purge system. For instance, the back-up purge system can be employed when the air purger has an absent status or an engageable lock (i.e., a trigger) has a triggered status (i.e., has already triggered), as detailed herein. As such, fluid-ejection air purger detection can ensure that any air is purged from the fluid-ejection device via the air purger or the back-up purger system so the fluid-ejection device functions as intended, and the consumer has a positive experience.

FIG. 1 is a block diagram of an example fluid-ejection device. The fluid-ejection device 100 includes a fluidic tube 116 to fluidically connect to a fluid supply such as the fluid supplies as detailed herein. The fluid supply or supplies may be off-axis to a carriage 102, or on-axis in another implementation. For instance, in some examples the fluid supply can be a CISS that is off-axis to the carriage 102.

As mentioned, the fluid-ejection device 100 includes the carriage 102. The carriage has a fluidic interconnector 106 fluidically connectable to the fluidic tube 116 and movable to an air purge position. The fluid-ejection device 100 includes an air purger (e.g., air purger 201) removably disposable within a receiver 111 in the carriage 102 and fluidically connectable to the fluidic interconnector 106. That is, the receiver 111 can be sized and shaped to receive the air purger, as detailed herein, when the air purger is present. The receiver can be, for instance, be a bracket or other structure that is sized and shaped to receive the air purger and permit the air purger to be connected to the fluidic interconnector 106. The fluid-ejection device 100 includes a release key 110 to engage the air purger in an air purge position of the carriage 102 to cause the air purger to purge a specified volume of air from the fluidic tube 116 via the fluidic interconnector 106.

The fluid-ejection device 100 can be an inkjet-printing device, such as an inkjet printer or an all-in-one (AIO) printing device including other functionality in addition to printing functionality. The fluid-ejection device 100 can be a device that ejects fluid other than ink. The fluid-ejection device 100 may be a pagewide device having a printhead array in relation to which media advances for ejection of fluid thereon. The fluid-ejection device 100 may thus form images on media in the case of a printing device, or may be a three-dimensional (3D) printing device that additively deposits layers of print material (e.g., fluid) to form 3D objects.

Figure 2:
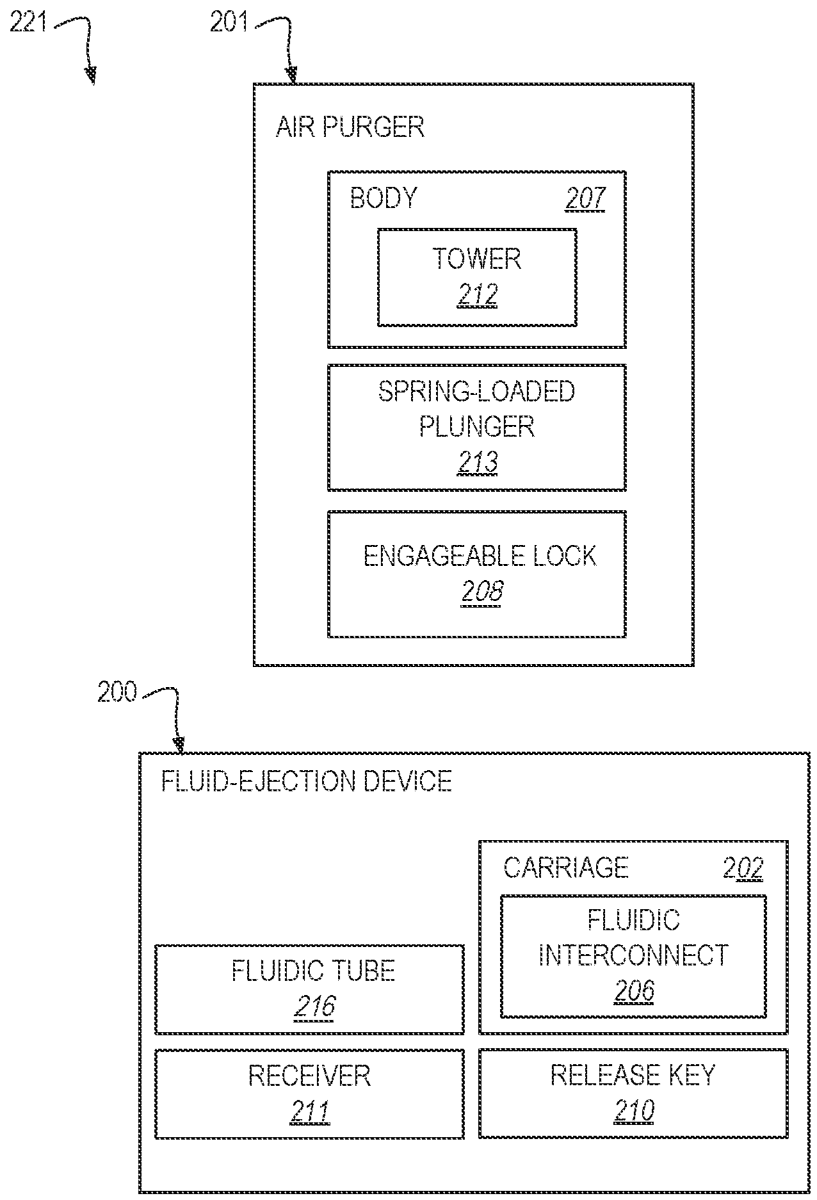
FIG. 2 is a block diagram of an example system suitable for fluid-ejection device air purger detection consistent with the disclosure.

FIG. 2 is a block diagram of an example system 221 suitable for fluid-ejection device air purger detection consistent with the disclosure. The air purger 201 includes a body 207 having a tower 212 to fluidically connect to a fluidic interconnector of the fluid-ejection device 200. The fluid-ejection device 200 can be analogous to or similar to the fluid-ejection device 100 as described in FIG. 1. For instance, the fluid-ejection device 200 can include a carriage 202 having a fluidic interconnect 206, a fluidic tube 216, a release key 210, and a receiver 211.

The air purger 201 includes a spring-loaded plunger 213 extendably disposed within the body 207 and fluidically connected to the tower 212. The air purger 201 includes an engageable lock 208 that is rotatably attached to the body 207. The engageable lock 208 has a locked position in which it maintains the spring-loaded plunger 213 in a compressed position and an unlocked position in which it releases the spring-loaded plunger 213 to an extended position as which the air is purged from the fluid-ejection device 200.

Figure 3A:
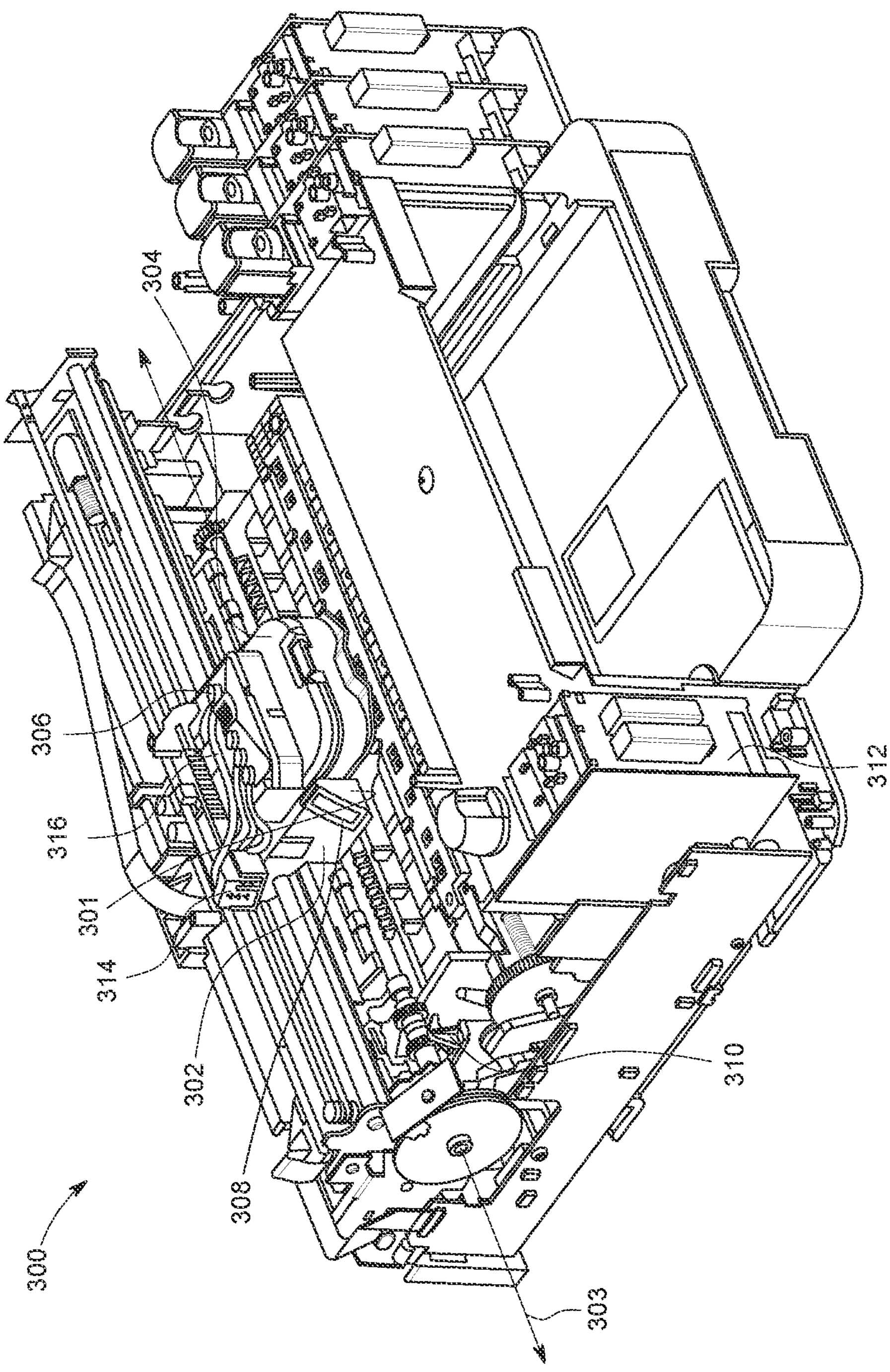
FIG. 3A is a diagram of an example fluid-ejection device having an air purger present and a carriage that is in a first position.
Figure 3B:
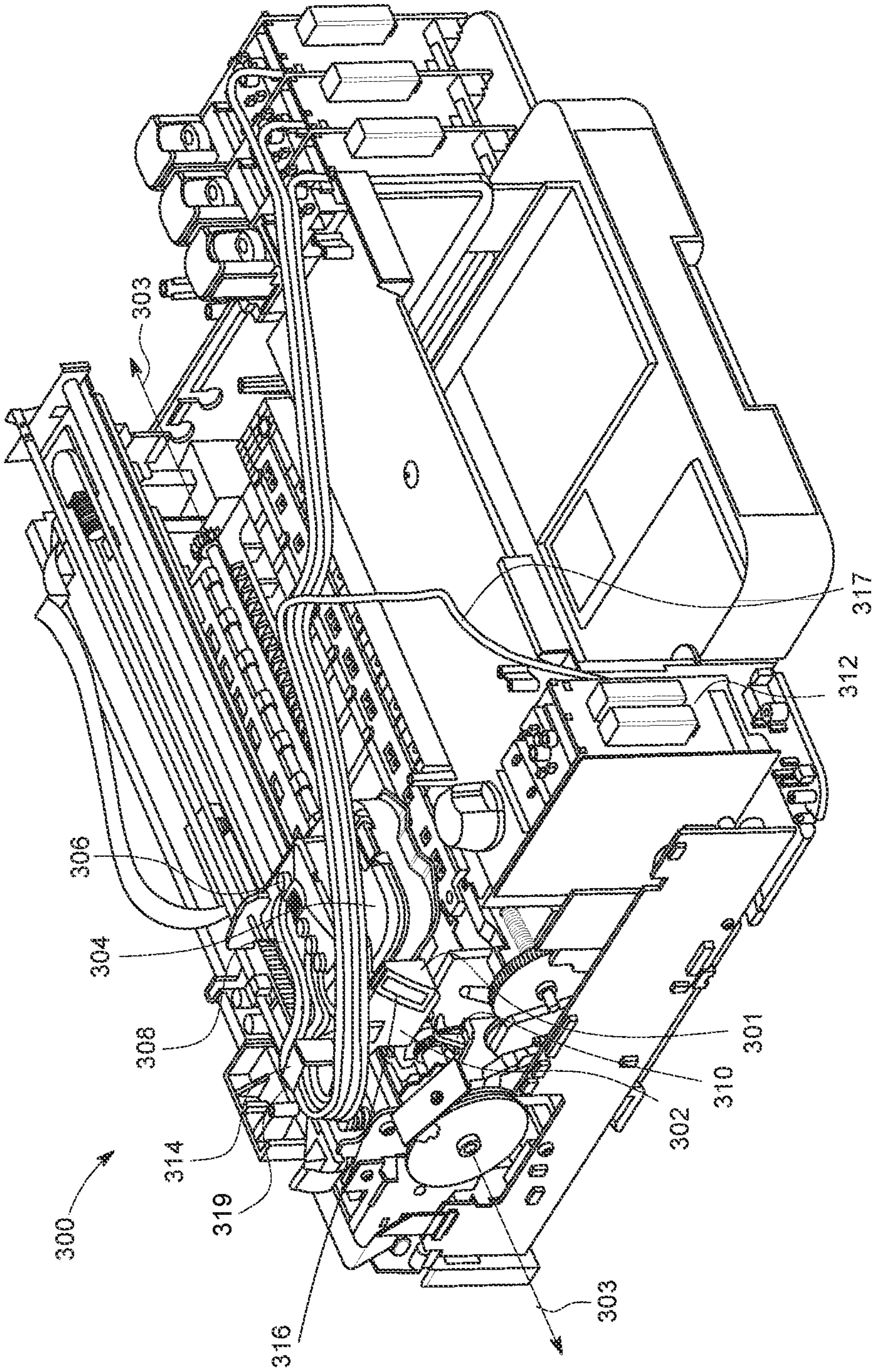
FIG. 3B is a diagram of an example fluid-ejection device having an air purger present and a carriage that is in a second position.

FIG. 3A is a diagram of an example fluid-ejection device 300 having an air purger present and a carriage 302 that is in a first position. FIG. 3B is a diagram of the example fluid-ejection device 300 having an air purger present and the carriage 302 that is in a second position. That is, the carriage 302 is movable back and forth about an axis per arrows 303. The carriage 302 is in a first position (e.g., a non-air purge position) in FIG. 3A, and is in a second position (e.g., an air purge position) in FIG. 3B. Positions of the carriage 302 other than those illustrated in FIGS. 3A and 3B are possible. For instance, in some examples the first position can have the carriage positioned at a first distal end of the axis 303 that is opposite from the second position (e.g., the second position located at a second distal end of the axis 303, as illustrated in FIG. 3B).

In any case, the first position can be spaced a distance from the second position along the axis 303. Determination of the distance between the first position and the second position can permit determination of a status of the air purger, a status of an engageable lock 308 of the air purger, or both, as detailed herein.

The carriage 302 has a cover 304, and the air purger 301 is removably coupled to the carriage 302 under the cover 304. Being removably coupled refers to the air purger 301 be coupled in a manner to permit the air purger 301 to purge the fluid-ejection device 300 and subsequently be decoupled from the fluid-ejection device 300 and disposed of. The cover 304 thus impedes accidental engagement of the engageable lock 308 when the air purger 301 is disposed in the carriage 302 by covering the engageable lock 316. The carriage 302 further has fluidic interconnectors 306 to which towers (e.g., tower 212 as described with respect to FIG. 2) fluidically connect when the air purger 301 is installed within the carriage 302.

The fluid-ejection device 300 includes fluidic tubes 316 that extend from the fluidic interconnectors 306 to a fluidic interface 314. The fluid-ejection device 300 includes replenishable fluid supplies 312. As depicted specifically in FIG. 3B, the fluid-ejection device 300 includes other fluidic tubes 317 that extend to another fluidic interface 319 that fluidically mates with the fluidic interface 314. The fluidic tubes 317 are not shown in FIG. 3A to better show the fluidic interface 314.

The fluidic tubes 316 and 317, via the fluidic interfaces 314 and 319, can thus be said to fluidically connect the fluidic interconnectors 306 to the fluid supplies 312. As shown, there can be four fluid supplies 312 with respective fluidic interconnectors 306, fluidic tubes 316, and fluidic tubes 317. In the case in which the fluid-ejection device 300 is a color inkjet-printing device, the four fluid supplies 312 can correspond to black, cyan, magenta, and yellow ink so that the fluid-ejection device 300 can form full-color images. In other implementations, there may be fewer or more than four fluid supplies 312.

The fluid-ejection device 300 includes a release key 310. Movement of the carriage 302 to the second position (e.g., the air purge position) of FIG. 3B can result in the release key 310 engaging the air purger 301, when the air purger 301 has a present status, and the engageable lock 308 has an untriggered status, and when the carriage is moved at a sufficient speed (e.g., a speed greater than a trigger speed, as detailed herein). In such instances, engagement of the air purger 301 can cause the air purger 301 to draw a specified volume of air from the fluidic tubes 316 and 317 via or through the fluidic interconnectors 306. Fluid from the fluid supplies 312 in turn is drawn through the fluidic tubes 317 and 308 to the fluidic interconnectors 306. For instance, the release key 310 can engaged the engageable lock 308 of the air purger 301, causing the engageable lock 308 to rotate counter-clockwise to the unlocked position. Rotation of the engageable lock 308 releases a spring-loaded plunger (e.g., spring-loaded plunger 213 as illustrated in FIG. 2) to the uncompressed position, purging a specified of air from the fluid-ejection device 300.

The volume of air that the air purger 301 is to purge from the fluidic tubes 316 can be specified during design of the air purger 301 to correspond to the volume of space within the tubes 316 and 317, among other possibilities. In other implementations, the fluidic tubes 316 and 317 can be sized to correspond to the volume of air that the air purger 301 purges upon engagement. The volume of air that the air purger 301 is to purge and the volume of space within the fluidic tubes 316 and 317 thus correspond to one another.

When the fluid-ejection device 300 is shipped from the manufacturer, the fluid supplies 312 can be empty, and the fluidic tubes 316 and 317 can be similarly dry of fluid. During setup of the fluid-ejection device 300, the fluidic tubes 317 are connected to the supplies 312, and also connected to the fluidic tubes 316 via connecting the fluidic interface 319 to the fluidic interface 314. The fluid supplies 312 are filled with fluid, and the carriage 302 is moved between the first position and the second position to determine a status of the air purger 301, a status of the engageable lock 308 of the air purger, or both, as detailed herein. Based on a status of the air purger 301 and a status of the engageable lock 308 of the air purger, or both can be purged via the air purger 301 or via a back-up purge system. For instance, as illustrated in FIG. 38 air can be purged via the air purger 301 when the carriage 302 is moved to the air purge position of FIG. 3B to engage the air purger 301 and thereby permit purging of the air from the fluidic tubes 316 and 317 and draw fluid from the supplies 312 to the fluidic interconnectors 306.

Figure 4:
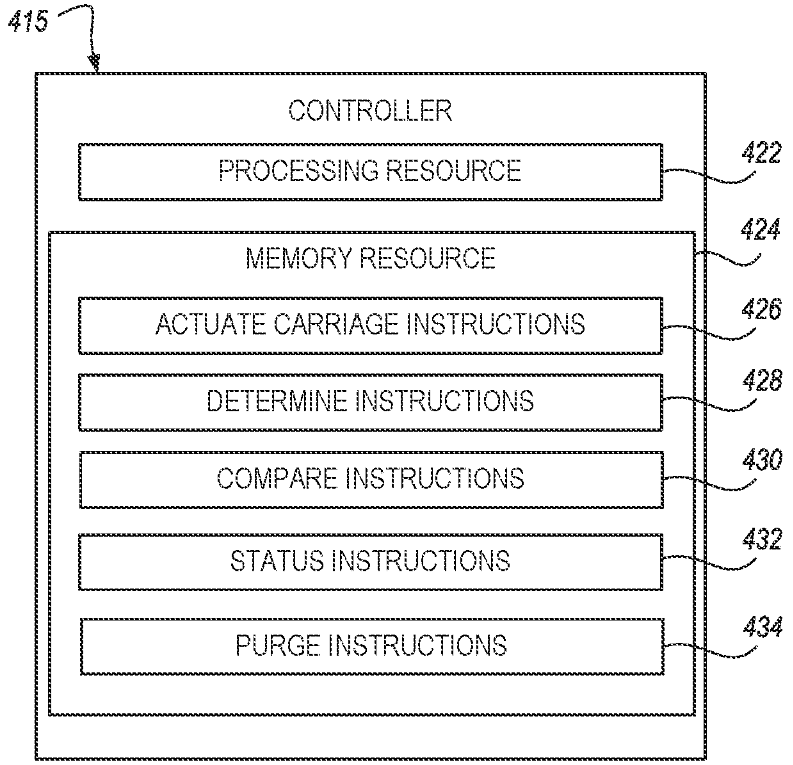
FIG. 4 is block diagram of an example controller for fluid-ejection device air purger detection consistent with the disclosure.

FIG. 4 is block diagram of an example controller 415 for fluid-ejection device air purger detection consistent with the disclosure. As described herein, the controller 415 may perform functions related to fluid-ejection device air purger detection consistent with the disclosure.

The controller 415 may include a processing resource 422 and a machine-readable storage medium such as the memory resource 424 storing non-transitory machine-readable instructions, as detailed herein. Although the following descriptions refer to an individua processing resource and an individua machine-readable storage medium, the descriptions may also apply to a system with multiple processing resources and multiple machine-readable storage mediums. The controller 415 may be distributed across multiple machine-readable storage mediums and across multiple processors. Put another way, the instructions executed by the controller 415 may be stored across multiple machine-readable storage mediums and executed across multiple processors, such as in a distributed or virtual computing environment.

Processing resource 422 may be a central processing unit (CPU), a semiconductor-based microprocessor, and/or other hardware devices suitable for retrieval and execution of non-transitory machine-readable instructions 426, 428, 430, 432, and 434 stored in a memory resource 424. Processing resource 422 may fetch, decode, and execute instructions 426, 428, 430, 432, and 434. As an alternative or in addition to retrieving and executing instructions 426, 428, 430, 432, and 434 processing resource 422 may include a plurality of electronic circuits that include electronic components for performing the functionality of instructions 426, 428, 430, 432, and 434.

Memory resource 424 may be any electronic, magnetic, optical, or other physical storage device that stores executable instructions 426, 428, 430, 432, and 434, and/or data. Thus, memory resource 424 may be, for example, Random Access Memory (RAM), an Electrically-Erasable Programmable Read-Only Memory (EEPROM), a storage drive, an optical disc, and the like. Memory resource 424 may be disposed within controller 415, as shown in FIG. 4. Additionally, memory resource 424 may be a portable, external or remote storage medium, for example, that causes controller 415 to download the instructions 426, 428, 430, 432, and 434 from the portable/external/remote storage medium.

The controller 415 may include instructions 426 stored in the memory resource 424 and executable by the processing resource 422 to cause a carriage in a fluid-ejection device having a continuous ink supply system (CISS) to actuate from a first position (e.g., as illustrated in FIG. 3A) to a second position (e.g., as illustrated in FIG. 3B). For instance, the controller 415 can emit a signal to a component or cause cessation of emission of a signal to a component. Responsive to the emission or cessation of emission of a signal to the component the carriage can be caused to actuate. For example, the controller 415 can emit a signal to a motor or actuator responsive to which the motor or actuator can cause the carriage to actuate such as to actuate from the first position to the second position. The carriage can therefore travel a given distance between the first position and the second position.

In some examples, the controller 415 can cause the carriage to actuate at a speed that is less than a speed threshold, at a stall force that is less than a stall threshold, or both. Having a relatively lower carriage speed (less than a speed threshold), lower stall force (less than a stall threshold), or both, can permit determination of a status of the air purger, a status of an engageable lock in the air purger, or both, as detailed herein, and yet can ensure that the carriage does not inadvertently contact the release key (e.g., the release key 310 as illustrated in FIG. 3A and FIG. 38) with sufficient force to trigger the engageable lock which would otherwise cause the air purger to initiate air purging (e.g., if the carriage were operated at or above the speed threshold, the stall threshold, or both).

For instance, the controller 415 can in some examples, cause the carriage to actuate from the first position to the second position at a speed that is less than a speed threshold to permit determination of a status of the air purger, a status of an engageable lock in the air purger, or both. The speed threshold can be equal to a speed that would otherwise be expected to cause actuation of the engageable lock of the air purger and thus trigger air purging of the fluid-ejection device. For instance, the speed threshold can be equal to 50 inches per second, 40 inches per second, 30 inches per second, 20 inches per second, 15 inches per second, 10 inches per second, 7 inches per second, 5 inches per second 3 inches per second, or another value. For instance, in some examples, the controller 415 can cause the carriage to actuate at a speed that is equal to or less than 50%, 40%, 30%, or 20% of a speed threshold (e.g., 40 inches per second, 30 inches per second, 20 inches per second, etc.), and thus can be permit determination of a status of the air purger, a status of an engageable lock in the air purger, or both, as detailed herein, and yet can ensure that the carriage does not inadvertently contact the release key with sufficient force to trigger the engageable lock which would otherwise cause the air purger to initiate air purging.

As mentioned, the controller 415 can cause the carriage to operate at a stall force that is less than a stall threshold to permit determination of a status of the air purger, a status of an engageable lock in the air purger, or both. As used herein, the "stall force" refers to an amount of force encountered by the carriage as the carriage actuates along the axis at which the carriage will cease to actuate along the axis (e.g., an amount of force at which a motor and/or actuator actuating the carriage will cease to actuate the carriage). The stall force and/or stall threshold be a value or range of values. For instance, the stall threshold can be in a range from 3 to 15 newtons, or in a range from 5-7 newtons, among other possible values.

The controller 415 may include instructions 428 stored in the memory resource 424 and executable by the processing resource 422 to determine a distance between the determine a distance between the first position and the second position. For instance, the controller 415 can determine a distance traveled by the carriage between the first position and the second position.

In some examples, the distance can be determined based on an encoder count. As used herein, an "encoder" refers to a device which can track a location of a carriage along an axis. Examples of encoder include rotary encoders, optical encoders, among other possibilities. For instance, the first position, the second position, or both, can have a respective encoder count associated therewith. A given encoder count can correspond to a given carriage position along an axis (e.g., axis 303 as illustrated in FIG. 3A and FIG. 3B). An increase in an encoder count can correspond to an increase in a distance of the carriage from a first position (e.g., a home position).

For example, the first position can have a first encoder count (e.g., 0 that is associated with a "home" position) while the second position can have a second encoder count (e.g., 28500) that is different than the first encoder count. For instance, a first encoder count can correspond to a carriage being located as at first position (e.g., a home position) that is adjacent to and in contact with a wall (e.g., a right wall) of the ink-ejection device. In such instances, the second position can have a second encoder count (e.g., 28500) that is indicates an updated location of the carriage along the axis, for instance, responsive to actuation of the carriage. Thus, an "end" location corresponding to the second position of the carriage can be determined and similarly a distance traveled by the carriage (e.g., a distance from the first position to the second position can be determined). The distance between the first position and the second position can be equal to an encoder count of the second position minus the encoder count of the second position, among other possibilities. The resultant location of the carriage (e.g., an individual encoder count at the second position) and/or a distance between the first position and the second position can be compared to a threshold.

Comparing the resultant location of the carriage (e.g., an individual encoder count at the second position) and/or a distance between the first position and the second position to the threshold can permit determination of a status of the air purger, a status of an engageable lock of the air purger, or both. For instance, the controller 415 may include instructions 430 stored in the memory resource 424 and executable by the processing resource 422 to compare the distance (e.g., as determined by execution of instructions 428) to a threshold.

The threshold can be an individual value or a range of values. For instance, the threshold can be an individual value (e.g., 28500 encoder counts). In such instances, the resultant location of the carriage (e.g., an individual encoder count at the second position) and/or a distance between the first position and the second position can compared to the individual value. The threshold can be included in a plurality of thresholds. For instance, a plurality of thresholds can correspond to a particular status of a plurality of statuses (e.g., present, absent, etc.) of the air purger, a plurality of thresholds can correspond to a particular status of a plurality of statuses of the engageable lock (e.g., triggered, not triggered, etc.), or both.

For example, the resultant location of the carriage can have a corresponding encoder count (e.g., 28550) and/or a distance (as measured in encoder counts or otherwise measured) from the first location that is greater than the encoder count. As such, it can be determined that an air purger has an absent status (i.e., an air purger is not present). Conversely, if the corresponding encoder count (e.g., 28450) and/or a distance (as measured in encoder counts or otherwise measured) from the first location is less or equal to threshold it can be determined that the air purger has a present status. That is, the present status of the air purger can correspond to an encoder count that is less than an encoder count corresponding to a absent status of the air purger.

Similarly, a value corresponding to the resultant location of the carriage and/or a distance from a first position to a second position can be compared to a threshold to determine a status of an engageable lock. For instance, a resultant location can have an encoder count (e.g., 27770) that is in a range (e.g., 27700 to 28499) indicative of the presence of an air purger with a triggered status. Conversely, a resultant location can have an encoder count (e.g., 27400) that is in a range (e.g., 27301 to 27699) indicative of the presence of an air purger with a non-triggered status. That is, the non-triggered status of an engageable lock of the air purger can correspond to an encoder count that is greater than an encoder count corresponding to a triggered status of the engageable lock.

That is, in some examples a hierarchy of threshold can be employed to determine which, if any, of the thresholds are exceeded and thereby determine both a status of the air purger and a status of an engageable lock in the air purger, among other possibilities. For instance, a first threshold can correspond to when an air purger has an absent status and the engageable lock has a non-triggered status, a second threshold corresponding to when the air purger has a present status and the engageable lock has a triggered status, and a third threshold corresponding to when the air purger has a present status and the engageable lock has a non-triggered status. In such instance, the first threshold can have a value (or range of values) that is greater than the second threshold, while the second threshold can have a value (or range of values) that is greater than the third threshold.

In some examples, the controller 415 can cause the air purger to purge air from the fluid-ejection device when an encoder count associated with the location of the carriage at the second position and/or a distance from the first position to the second position satisfies a threshold. For instance, when an encoder count (e.g., 27350) associated with a carriage at a second position is within a range of values (e.g., 27301 to 27699) the controller 415 can cause the air purger to purge air from the fluid-ejection device. In some examples, the controller 415 can cause the air purger to purge air from the fluid-ejection device in the absence of the fluid-ejection device ejecting fluid from a nozzle in the fluid-ejection device. Thus, any unwarranted wear on components such as nozzles or a spittoon in the fluid-ejection device can be avoided.

However, in some examples, the controller 415 can cause a back-up air purge system to purge air from the fluid-ejection device when an encoder count associated with the location of the carriage at the second position does not satisfy (e.g., is greater than) the threshold. For instance, when an encoder count (e.g., 28150) associated with a carriage at a second position greater than a range of values (e.g., 27301 to 27699) the controller 415 can cause the back-up air purge system to purge air from the fluid-ejection device. For instance, the back-up air purge process includes causing the fluid-ejection device to eject fluid from a nozzle in the fluid-ejection device.

The controller 415 may include instructions 432 stored in the memory resource 424 and executable by the processing resource 422 to determine, based on the comparison of the distance to the threshold, a status of an air purger included in the fluid-ejection device, a trigger status of the air purger, or both. For instance, the controller 415 can determine whether the distance (or an individual value associated with a second position) satisfies a threshold and based thereon determine a status of an air purger included in the fluid-ejection device, a trigger status of the air purger, or both. For example, the controller 415 can determine that an air purger has present status and an engageable lock as a non-triggered status wen a value (e.g., an encoder count associated with a second position and/or a distance from a first position to the second position) is within a threshold range of values (e.g., e.g., 27301 to 27699), among other possibilities.

The controller 415 may include instructions 434 stored in the memory resource 424 and executable by the processing resource 422 to cause, based on the status of the air purger and the trigger status of the air purger, the air purger or a back-up purge system to purge any air (e.g., entrained air) from the fluid-ejection device, as detailed herein. In some examples, the controller 415 can cause the air purger to purge air from the fluid-ejection device responsive to a determination that the air purger has a present status and the engageable lock has an untriggered status. However, in some examples the controller 415 can cause a back-up purge system to purge air from the fluid-ejection device responsive to a determination that: the air purger has an absent status or the air purger has a present status and the engageable lock has a triggered status.

Figure 5:
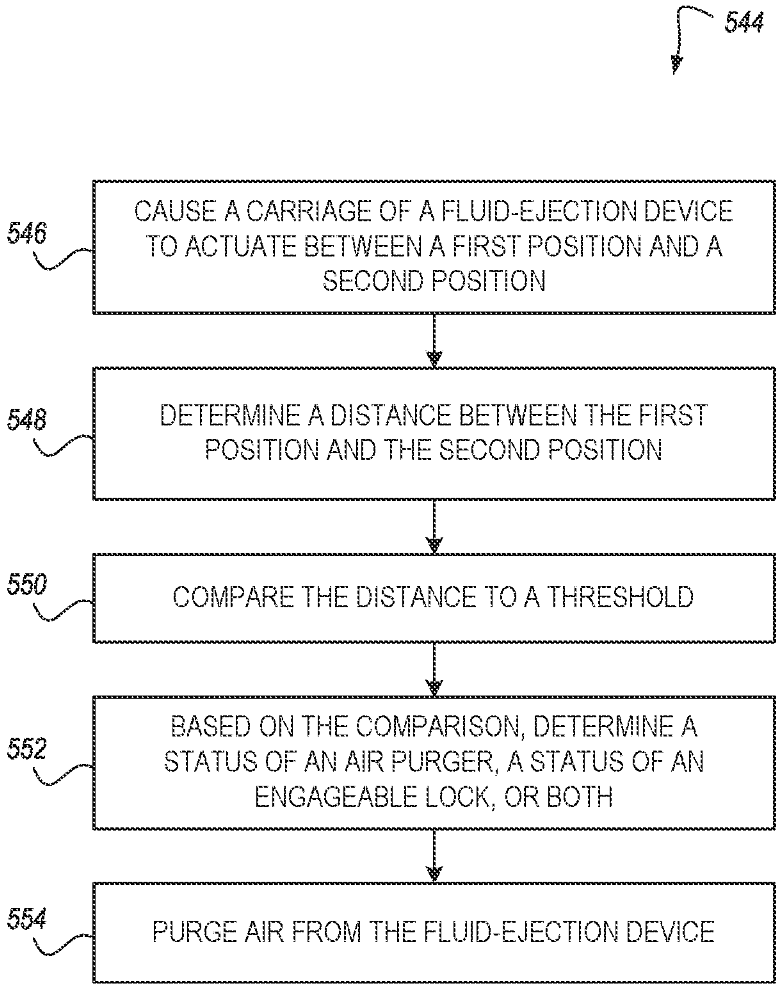
FIG. 5 is an example of a method for fluid-ejection device air purger detection consistent with the disclosure.

FIG. 5 is an example of a method 544 for fluid-ejection device air purger detection consistent with the disclosure. The method 544 can be performed by a fluid-ejection device such as those described herein. At 546, the method 544 can include causing a carriage in a fluid-ejection device having a continuous ink supply system (CISS) to actuate from a first position to a second position, as detailed herein. At 548, the method 544 can include determining a distance between the first position and the second position, as detailed herein. At 550 the method 544 can include comparing the distance to a threshold, as detailed herein. At 552, the method 544 can, based on the comparison of the distance to the threshold, include determining a status of an air purger included in the fluid-ejection device, a status of the engageable lock, or both, as detailed herein. At 554, the method 544 can, based on the status of the air purger and the status of the engageable lock, include causing the air purger or a back-up purge system to purge any air from the fluid-ejection device, as detailed herein.

In the foregoing detailed description of the disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the disclosure. Further, as used herein, "a" can refer to one such thing or more than one such thing.

The figures herein follow a numbering convention in which the first digit corresponds to the drawing figure number and the remaining digits identify an element or component in the drawing. For example, reference numeral 100 may refer to element 100 in FIG. 1 and an analogous element may be identified by reference numeral 200 in FIG. 2. Elements shown in the various figures herein can be added, exchanged, and/or eliminated to provide additional examples of the disclosure. In addition, the proportion and the relative scale of the elements provided in the figures are intended to illustrate the examples of the disclosure, and should not be taken in a limiting sense.

It can be understood that when an element is referred to as being "on," "connected to", "coupled to", or "coupled with" another element, it can be directly on, connected, or coupled with the other element or intervening elements may be present. In contrast, when an object is "directly coupled to" or "directly coupled with" another element it is understood that are no intervening elements (adhesives, screws, other elements) etc.

The above specification, examples and data provide a description of the method and applications, and use of the system and method of the disclosure. Since many examples can be made without departing from the spirit and scope of the system and method of the disclosure, this specification merely sets forth some of the many possible example configurations and implementations.

What is claimed is:

1. A fluid-ejection device comprising:
- a fluidic tube to fluidically connect to a fluid supply;
- a carriage having a fluidic interconnector fluidically connectable to the fluidic tube and movable between a first position and a second position;
- a receiver to receive an air purger, wherein the air purger, when present, is coupled to the receiver and fluidically connectable to the fluidic interconnector; and
- a controller to:
  - cause the carriage to actuate from the first position to the second position;
  - determine a location of the carriage at the second position; and
  - based on the location of the carriage at the second position, detect:
    - a status of the air purger, a status of an engageable lock in the air purger, or both.

2. The fluid-ejection device of claim 1, wherein the status of the air purger and the status of the engageable lock correspond to a plurality of thresholds.

3. The fluid-ejection device of claim 2, wherein the plurality of thresholds includes:
- a first threshold corresponding to when an air purger has an absent status and the engageable lock has a non-triggered status;
- a second threshold corresponding to when the air purger has a present status and the engageable lock has a triggered status; and
- a third threshold corresponding to when the air purger has a present status and the engageable lock has a non-triggered status.

4. The fluid-ejection device of claim 1, wherein the controller is further to determine the location of the carriage at the second position based on an encoder count.

5. The fluid-ejection device of claim 4, wherein the controller is to cause the air purger to purge air from the fluid-ejection device when an encoder count associated with the location of the carriage at the second position is satisfies a particular threshold of the plurality of thresholds.

6. The fluid-ejection device of claim 5, wherein the controller is to cause the air purger to purge air from the fluid-ejection device in the absence of the fluid-ejection device ejecting fluid from a nozzle in the fluid-ejection device.

7. The fluid-ejection device of claim 4, wherein the controller is to cause a back-up air purge system to purge air from the fluid-ejection device when an encoder count associated with the location of the carriage at the second position does not satisfy a particular threshold of the plurality of thresholds.

8. The fluid-ejection device of claim 7, wherein a process of the back-up air purge system includes causing the fluid-ejection device to eject fluid from a nozzle in the fluid-ejection device.

9. A system comprising:

an air purger; and a fluid-ejection device comprising:

a fluidic tube to fluidically connect to a fluid supply;

a carriage having a fluidic interconnector fluidically connectable to the fluidic tube and movable between a first position and a second position;

a receiver to receive the air purger, wherein the air purger is coupled to the receiver and fluidically connectable to the fluidic interconnector; and a controller to:

cause the carriage to actuate from the first position to the second position;

determine a distance between the first position and the second position;

compare the distance to a threshold; and based on the comparison of the distance to the threshold, detect a status of the air purger, a status of an engageable lock, or both.

10. The system of claim 9, wherein the air purger is removably coupled to the receiver.

11. The system of claim 9, wherein the fluid supply further comprises a continuous ink supply system (CISS).

12. The system of claim 9, wherein the controller is to cause the air purger to purge air from the fluid-ejection device responsive to a determination that the air purger has a present status and the engageable lock has an untriggered status.

13. The system of claim 9, wherein the controller is to cause a back-up purge system to purge air from the fluid-ejection device responsive to a determination that:

the air purger has an absent status; or the air purger has a present status and the engageable lock has a triggered status.

14. A controller comprising:

a processing resource; and a memory resource storing non-transitory machine-readable instructions to cause the processing resource to:

cause a carriage in a fluid-ejection device having a continuous ink supply system (CISS) to actuate from a first position to a second position;

determine a distance between the first position and the second position;

compare the distance to a threshold;

based on the comparison of the distance to the threshold, determine a status of an air purger included in the fluid-ejection device, a status of an engageable lock, or both; and based on the status of the air purger and the status of the engageable lock cause the air purger or a back-up purge system to purge air from the fluid-ejection device.

15. The controller of claim 14, wherein the controller is further to cause the carriage to actuate from the first position to the second position at a speed that is less than a speed threshold, wherein the speed is less than 10 inches (in)/second(s), 7 inches in/s, less than 5 in/s, or less than 3 in/s.

* * * * *